US012710140B2

(12) United States Patent
Luu et al.

(10) Patent No.: US 12,710,140 B2
(45) Date of Patent: Aug. 18, 2026

(54) CRYOGENIC TANK SUPPORT SYSTEM

(71) Applicant: The Boeing Company, Arlington, VA (US)

(72) Inventors: Tin A. Luu, Garden Grove, CA (US); Faith O'Brien, Long Beach, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/747,546

(22) Filed: Jun. 19, 2024

(65) Prior Publication Data

US 2025/0383051 A1 Dec. 18, 2025

Related U.S. Application Data

(60) Provisional application No. 63/659,039, filed on Jun. 12, 2024.

(51) Int. Cl.
*F17C 13/08* (2006.01)
*B64D 37/04* (2006.01)
*F17C 3/08* (2006.01)

(52) U.S. Cl.
CPC ............ *F17C 13/083* (2013.01); *B64D 37/04* (2013.01); *F17C 3/08* (2013.01);
(Continued)

(58) Field of Classification Search
CPC ........... F17C 2270/0189; F17C 13/083; F17C 13/08; F17C 2205/0157; F17C 2205/018;
(Continued)

(56) References Cited

U.S. PATENT DOCUMENTS 2,465,095 A * 3/1949 Harvey ................. F17C 13/123
220/327
3,129,836 A * 4/1964 Frevel .................. B01J 19/0053
206/521

(Continued)

FOREIGN PATENT DOCUMENTS

EP 4029786 A1 7/2022
GB 2591253 A 7/2021

(Continued)

OTHER PUBLICATIONS

Kisska et al., "Top-Fuselage Mounted Cryogenic Tank," filed Jun. 19, 2024, U.S. Appl. No. 18/747,556, 38 pages.

(Continued)

*Primary Examiner* — Stephen J Castellano
(74) *Attorney, Agent, or Firm* — Yee & Associates, P.C.

(57) ABSTRACT

A cryogenic tank support system and a method for installing a cryogenic tank on an aircraft. The cryogenic tank support system includes an inner ring of a support collar connected to an inner wall of a cryogenic tank. An outer ring of the support collar is connected to an outer wall of the cryogenic tank. The system also includes a saddle of a saddle bracket connected to the outer ring of the support collar. A mount surface of the saddle bracket is connected to a crown region of a fuselage of the aircraft. The system structurally isolates the cryogenic tank from the aircraft by carrying radial loads of the cryogenic tank and axial loads of the cryogenic tank with at least one support collar and carrying the radial loads of the cryogenic tank while allowing axial expansion/contraction of the cryogenic tank with at least one other support collar.

12 Claims, 13 Drawing Sheets

(52) U.S. Cl.
CPC ................ *F17C 2201/0109* (2013.01); *F17C 2201/035* (2013.01); *F17C 2203/0391* (2013.01); *F17C 2203/0629* (2013.01); *F17C 2205/0192* (2013.01); *F17C 2223/0161* (2013.01); *F17C 2270/0189* (2013.01)

(58) Field of Classification Search
CPC ...... F17C 2205/0153; F17C 2205/0107; F17C 2205/0192; B64D 37/04
See application file for complete search history.

(56) References Cited

U.S. PATENT DOCUMENTS

| | | | | |
|---|---|---|---|---|
| 5,429,268 | A * | 7/1995 | Hale | F17C 1/00 220/582 |
| 5,833,172 | A | 11/1998 | Grafwallner et al. | |
| 7,624,946 | B2 | 12/2009 | Schoene | |
| 7,871,042 | B2 | 1/2011 | Velicki et al. | |
| 9,701,416 | B2 | 7/2017 | Epstein et al. | |
| 9,938,025 | B2 | 4/2018 | Faure et al. | |
| 11,453,483 | B2 | 9/2022 | Page | |
| 11,807,383 | B2 | 11/2023 | Dean | |
| 12,497,188 | B2 | 12/2025 | Watts | |
| 2012/0217251 | A1* | 8/2012 | Handa | B60K 15/07 220/586 |
| 2018/0163924 | A1 | 6/2018 | Cook | |
| 2023/0339593 | A1 | 10/2023 | López-Herrero et al. | |
| 2023/0415907 | A1 | 12/2023 | Puschmann | |
| 2024/0116650 | A1 | 4/2024 | Metzner et al. | |
| 2024/0151358 | A1* | 5/2024 | Minas | F17C 5/04 |
| 2024/0270401 | A1 | 8/2024 | Kondo et al. | |
| 2025/0020285 | A1* | 1/2025 | An | F17C 13/084 |

FOREIGN PATENT DOCUMENTS

| | | | |
|---|---|---|---|
| GB | 2591255 | A | 7/2021 |
| KR | 20210014248 | A | 2/2021 |
| KR | 20210016174 | A | 2/2021 |
| WO | 2025132104 | A1 | 6/2025 |

OTHER PUBLICATIONS

European Patent Office Extended Search Report, dated Aug. 27, 2025, regarding Application No. EP25170282.5, 6 pages.
European Patent Office Extended Search Report, dated Oct. 8, 2025, regarding Application No. EP25179955.7, 6 pages.
Office Action, dated Feb. 12, 2026, regarding U.S. Appl. No. 18/747,556, 23 pages.

* cited by examiner

CRYOGENIC TANK SUPPORT SYSTEM

CROSS-REFERENCE TO RELATED APPLICATIONS

This application claims the benefit of U.S. Provisional Patent Application Ser. No. 63/659,039, filed Jun. 12, 2024, and entitled "Cryogenic Tank Support System," which is incorporated herein by reference in its entirety.

This application is related to the following U.S. Patent Application: U.S. patent application Ser. No. 18/747,556, entitled "Top-Fuselage Mounted Cryogenic Tank," filed even date hereof, which is incorporated herein by reference in its entirety.

BACKGROUND INFORMATION

1. Field

The present disclosure relates generally to aircraft. More specifically, the present disclosure relates to aircraft using propulsion systems powered using cleaner emission fuel alternatives such as hydrogen stored in fuel tanks mounted to the aircraft.

2. Background

As traditional jet fuel prices or carbon taxes rise, when combined with climate change, there is more incentive over time to use alternative fuels for powering large commercial aircraft.

One such alternative fuel is hydrogen. Hydrogen is an essentially inexhaustible resource as the most abundant source of hydrogen is water. As a fuel source, hydrogen is stored in liquid form. Liquid hydrogen fuel needs to be stored at cryogenic temperatures. In order to provide enough fuel for an aircraft to perform normally, large onboard cryogenic tanks are required for each aircraft.

The packaging of the fuel tanks, the addition of hydrogen specific systems to the aircraft, and the impacts of various safety considerations to the aircraft provide unique issues when incorporating the use of alternate fuels stored in cryogenic fuel tanks.

Issues include storage of the liquid hydrogen at cryogenic temperatures and how and where to attach the cryogenic tanks to the aircraft without upsetting the flight dynamics of the aircraft and without compromising the structural integrity of the aircraft.

Therefore, it would be desirable to have a method and apparatus that takes into account at least some of the issues discussed above, as well as other possible issues.

SUMMARY

An illustrative embodiment of the present disclosure provides a cryogenic tank support. The cryogenic tank support includes a cryogenic tank, a first support collar, a second support collar, a first saddle bracket, and a second saddle bracket. The first support collar is connected to the cryogenic tank. The first support collar is also connected to the first saddle bracket. The second support collar is connected to the cryogenic tank. The second support collar is also connected to the second saddle bracket. The first support collar carries radial loads of the cryogenic tank and carries axial loads of the cryogenic tank. However, the second support collar carries only the radial loads of the cryogenic tank and allows axial expansion and axial contraction of the cryogenic tank.

Another illustrative embodiment of the present disclosure provides a system for attaching a cryogenic tank to an aircraft. The system includes an inner ring of a support collar connected to an inner wall of the cryogenic tank. The system also includes an outer ring of the support collar connected to an outer wall of the cryogenic tank. The system also includes a saddle of a saddle bracket connected to the outer ring of the support collar. The system also includes a mount surface of the saddle bracket connected to a crown region of a fuselage of the aircraft.

A further illustrative embodiment of the present disclosure provides a method for installing a cryogenic tank on an aircraft. An inner ring of a support collar is connected to an inner wall of the cryogenic tank. An outer ring of the support collar is connected to an outer wall of the cryogenic tank. The support collar is connected to a saddle bracket. The saddle bracket is connected to a fuselage of the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account a number of different issues with respect to aircraft that operate using alternative fuel sources such as liquid hydrogen fuel. The issues recognized by the different illustrative embodiments are described herein.

The illustrative embodiments recognize and take into account that integrating a liquid hydrogen (LH2) system into a passenger aircraft, such as a large commercial aircraft, can be challenging. For example, design challenges are present in determining where to locate the large liquid hydrogen tanks safely and how to package the thermal management and fuel tank stack systems, both of which have large volume requirements.

In these illustrative examples, the location of the fuel tanks above or along the side of the fuselage and how the tanks are attached to the fuselage is described. This type of configuration can integrate the tanks in a safe manner while keeping the added weight from affecting the flight dynamics of the aircraft and structurally isolate the tanks from the structure of the aircraft. In one illustrative example, four cryogenic tanks are used to add redundancy and minimize slosh. In one illustrative example, a fairing encases the tanks and the tank support system for aerodynamic purposes.

Figure 1:
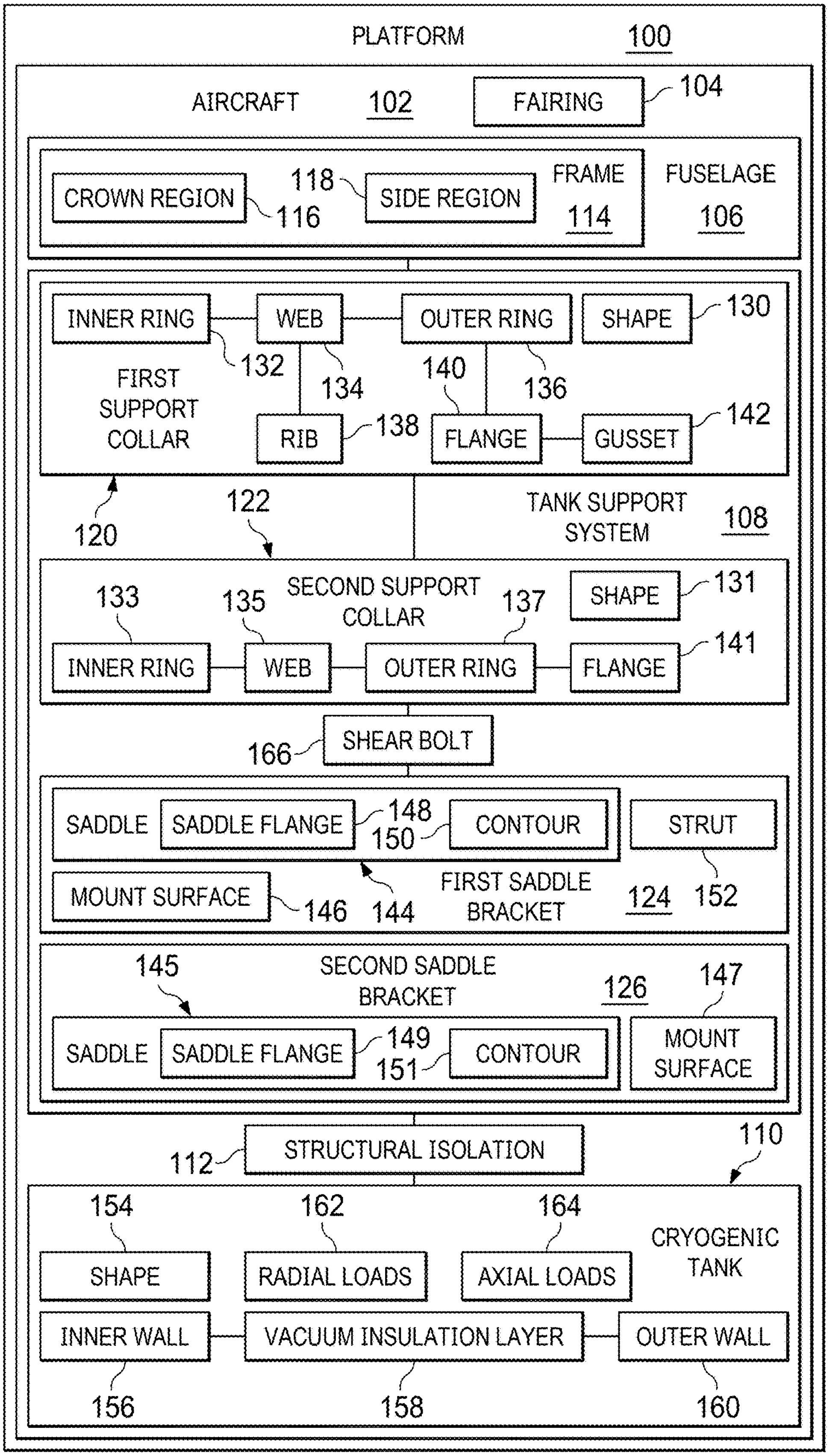
FIG. 1 is an illustration of a block diagram of a platform in accordance with an illustrative embodiment.

With reference now to the figures and, in particular, with reference to FIG. 1, an illustration of a block diagram of a platform is depicted in accordance with an illustrative example. Platform 100 has aircraft 102 in this illustrative example.

The illustration of aircraft 102 in FIG. 1 is not meant to imply physical or architectural limitations to the manner in which an illustrative example may be implemented. For example, although aircraft 102 may be a commercial aircraft, aircraft 102 may be a military aircraft, a rotorcraft, a helicopter, an unmanned aerial vehicle, or any other suitable aircraft.

Although the illustrative examples are described with respect to an aircraft, the illustrative example may be applied to other types of platforms. The platform may be, for example, a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, a tool, a mechanical structure, or some other suitable platform or structure where a cryogenic tank support system is desirable.

In this illustrative example, platform 100 takes the form of aircraft 102. In this illustrative example, when platform 100 takes the form of aircraft 102, aircraft 102 includes fairing 104, fuselage 106, tank support system 108, and cryogenic tank 110.

Tank support system 108 connects cryogenic tank 110 to fuselage 106 of aircraft 102. When tank support system 108 is used to connect cryogenic tank 110 to fuselage 106 of aircraft 102, cryogenic tank 110 is structurally isolated 112 from aircraft 102. In other words, the connection of cryogenic tank 110 to aircraft 102 does not structurally affect fuselage 106. Tank support system 108 carries radial loads and axial loads of cryogenic tank 110 at one end of cryogenic tank 110 while only carrying radial loads of cryogenic tank 110 and allowing axial expansion/contraction of cryogenic tank 110 relative to aircraft 102 at an opposite end of cryogenic tank 110. As a result, the addition of tank support system 108 to connect cryogenic tank 110 to aircraft 102 does not affect the structural rigidity and flexure of aircraft 102. Any forces acting on the aircraft resulting from intended use of the aircraft are isolated from the cryogenic tank and any forces acting on the cryogenic tank are isolated from the aircraft. Fairing 104 is connected to fuselage 106. Fairing 104 encases tank support system 108 and cryogenic tank 110 for aerodynamic purposes.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

The size and capacity of cryogenic tank 110 can be designed for the intended purpose of aircraft 102. Cryogenic tank 110 may be more than one cryogenic tank, for example a set of cryogenic tanks may be necessary. Tank support system 108 can be configured to accommodate any number of cryogenic tanks and is not limited to a single cryogenic tank.

As used herein, a "set of," when used with reference to items, means one or more items. For example, a "set of cryogenic tanks" is one or more cryogenic tanks.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Fuselage 106 includes frame 114. In this illustrative example, frame 114 represents the structural members that form fuselage 106. Frame 114 of fuselage 106 includes crown region 116 located on the top of fuselage 106 and side region 118 located on one or both sides of fuselage 106.

Tank support system 108 is connected to frame 114 of fuselage 106 in either crown region 116 or side region 118. Tank support system 108 is connected to cryogenic tank 110.

Tank support system 108 includes at least first support collar 120 and second support collar 122. The total number of support collars is determined by the number of cryogenic tanks to support. Each cryogenic tank requires at least two support collars.

First support collar 120 has shape 130. Second support collar 122 has shape 131. Shape 130 and shape 131 are sized and shaped to match cryogenic tank 110. Generally, cryogenic tank 110 is cylindrical shaped based on efficiencies of fuel storage. As a result, first support collar 120 and second support collar 122 are ring shaped with circumference and diameter dimensions that match the cylindrical shape of cryogenic tank 110. The shape of cryogenic tank 110 and the support collars is not limited to cylindrical and ring, respectively. First support collar 120 and second support collar 122 are shaped to match cryogenic tank 110 whatever shape cryogenic tank 110 may be.

First support collar 120 includes inner ring 132 connected to outer ring 136 by web 134. Web 134 extends between inner ring 132 and outer ring 136 around the entire circumference of first support collar 120. Inner ring 132 is wider than outer ring 136 to allow access to weld areas. Rib 138 is connected to inner ring 132 and outer ring 136 between inner ring 132 and outer ring 136. Rib 138 extends at an angle from web 134. Rib 138 can be orthogonal to web 134. Rib 138 can be a set of ribs evenly spaced around the circumference of first support collar 120. Flange 140 extends radially outward from outer ring 136. Gusset 142 is connected to outer ring 136 and flange 140. Gusset 142 can be a set of gussets evenly spaced around the circumference of first support collar 120. Each rib 138 is linearly aligned with at least one gusset 142.

Second support collar 122 includes inner ring 133 connected to outer ring 137 by web 135. Web 135 extends between inner ring 133 and outer ring 137 around the entire circumference of second support collar 122. Inner ring 133 is wider than outer ring 137 to allow access to weld areas. Flange 141 extends radially outward from outer ring 137.

First support collar 120 is capable of carrying radial loads 162 of the cryogenic tank and axial loads 164 of the cryogenic tank because of the presence of rib 138 and gusset 142. Second support collar 122 does not include ribs or gussets found on first support collar 120. As a result, second support collar 122 is capable of carrying only radial loads 162 of the cryogenic tank while allowing axial expansion/contraction of the cryogenic tank.

Tank support system 108 includes at least first saddle bracket 124 and second saddle bracket 126. The total number of saddle brackets is determined by the number of cryogenic tanks to support. Each cryogenic tank requires at least two saddle brackets where each saddle bracket is paired with at least one support collar. More than one support collar can be paired with each saddle bracket.

First saddle bracket 124 includes saddle 144 positioned opposite of mount surface 146. Mount surface 146 is the edge of first saddle bracket 124 connected to fuselage 106. Saddle 144 has contour 150. Contour 150 has a profile that matches shape 130 of first support collar 120. Saddle 144 includes saddle flange 148. Saddle flange 148 is connected to flange 140 of first support collar 120 with shear bolt 166. Strut 152 extends from first saddle bracket 124. First saddle bracket 124 in combination with first support collar 120 is capable of carrying radial loads 162 of the cryogenic tank. First saddle bracket 124 in combination with first support collar 120 is capable of carrying axial loads 164 of the cryogenic tank because of the presence of strut 152.

Second saddle bracket 126 includes saddle 145 positioned opposite of mount surface 147. Mount surface 147 is the edge of second saddle bracket 126 connected to fuselage 106. Saddle 145 has contour 151. Contour 151 has a profile that matches shape 131 of second support collar 122. Saddle 145 includes saddle flange 149. Saddle flange 149 is connected to flange 141 of second support collar 122 with shear bolt 166. Second saddle bracket 126 does not include a strut like found on first saddle bracket 124. As a result, second saddle bracket 126 in combination with second support collar 122 is capable of carrying only radial loads 162 of the cryogenic tank while allowing axial expansion/contraction of the cryogenic tank.

Cryogenic tank 110 is a double-walled, insulated tank for storing liquid hydrogen at cryogenic temperatures. Cryogenic tank 110 may be a set of cryogenic tanks. Cryogenic tank 110 includes inner wall 156 separated from outer wall 160 by vacuum insulation layer 158. Cryogenic tank 110 is generally cylindrical and has shape 154. Shape 154 matches shape 130 of first support collar 120, shape 131 of second support collar 122, contour 150 of saddle 144, and contour 151 of saddle 145.

Tank support system 108 supports cryogenic tank 110 and connects cryogenic tank 110 to fuselage 106 of aircraft 102. Tank support system 108 structurally isolates cryogenic tank 110 from fuselage 106 of aircraft 102. Tank support system 108 carries radial loads 162 and axial loads 164 of cryogenic tank 110 at one end of cryogenic tank 110 while only carrying radial loads 162 of cryogenic tank 110 and allowing axial expansion/contraction of cryogenic tank 110 relative to aircraft 102 at an opposite end of cryogenic tank 110. Because axial expansion/contraction of the cryogenic tank relative to the fuselage is allowed by tank support system 108, forces acting on the aircraft are isolated from the cryogenic tank and forces acting on the cryogenic tank are isolated from the aircraft.

The inner rings of the support collars are connected to the inner wall of the cryogenic tank. The inner rings are either welded or co-bonded directly to the inner wall of the cryogenic tank to avoid penetration through the inner wall if mechanical fasteners were used. The outer rings of the support collars are connected to the outer wall of the cryogenic tank. As a result, not only does tank support system 108 connect cryogenic tank 110 to fuselage 106 of aircraft 102, first support collar 120 and second support collar 122 support inner wall 156 within outer wall 160 of cryogenic tank 110. In other words, the support collars keep the outer wall of the cryogenic tank spaced from the inner wall of the cryogenic tank. As a result, vacuum insulation layer 158 between inner wall 156 and outer wall 160 remains uncompromised and provides a cryogenic temperature insulation layer around the entire exterior surface of inner wall 156.

Figure 2:
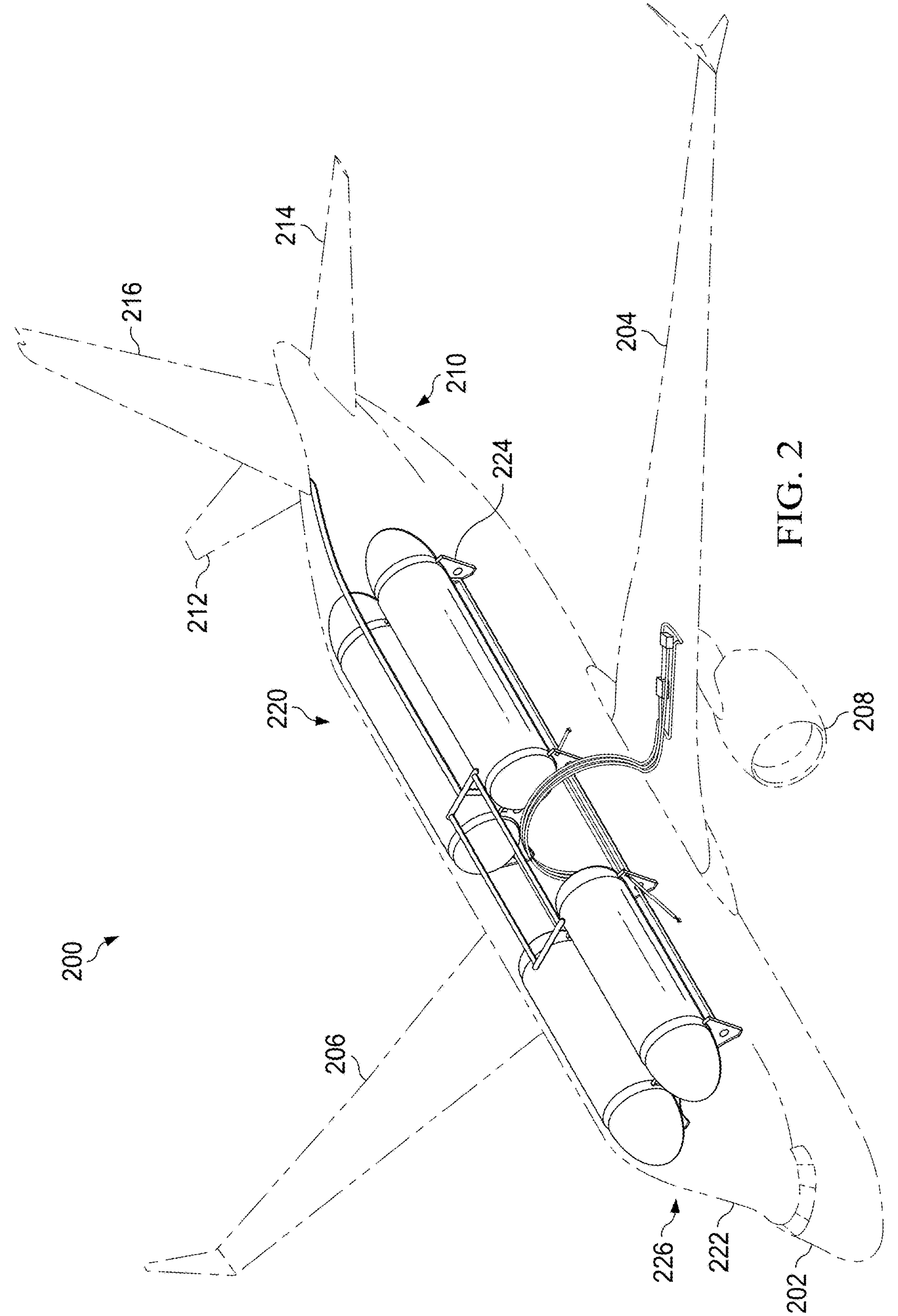
FIG. 2 is an illustration of an aircraft with a cryogenic tank in accordance with an illustrative embodiment.

With reference next to FIG. 2, an illustration of an aircraft with cryogenic tanks connected thereto with a tank support system is depicted in accordance with an illustrative embodiment. In this illustrative example and the illustrative examples that follow, the same reference numeral may be used in more than one figure. This reuse of a reference numeral in different figures represents the same element in the different figures. The components illustrated in FIG. 2 are examples of physical implementations of aircraft 102, fairing 104, fuselage 106, tank support system 108, and cryogenic tank 110 shown in block form in FIG. 1.

As illustrated, aircraft 200 includes fuselage 202. Aircraft 200 has wing 204 and wing 206 connected to fuselage 202. Aircraft 200 includes engine 208 connected to wing 204. Another engine (not shown) is connected to wing 206. Fuselage 202 has tail section 210. Horizontal stabilizer 212, horizontal stabilizer 214, and vertical stabilizer 216 are connected to tail section 210 of fuselage 202. Each tank of set of cryogenic tanks 220 is connected to crown region 222 of fuselage 202 with tank support system 224. Tank support system 224 structurally isolates set of cryogenic tanks 220 from fuselage 202 of aircraft 200. Fairing 226 is connected to fuselage 202. Fairing 226 encases tank support system 224 and set of cryogenic tanks 220 to improve aerodynamics.

Figure 3:
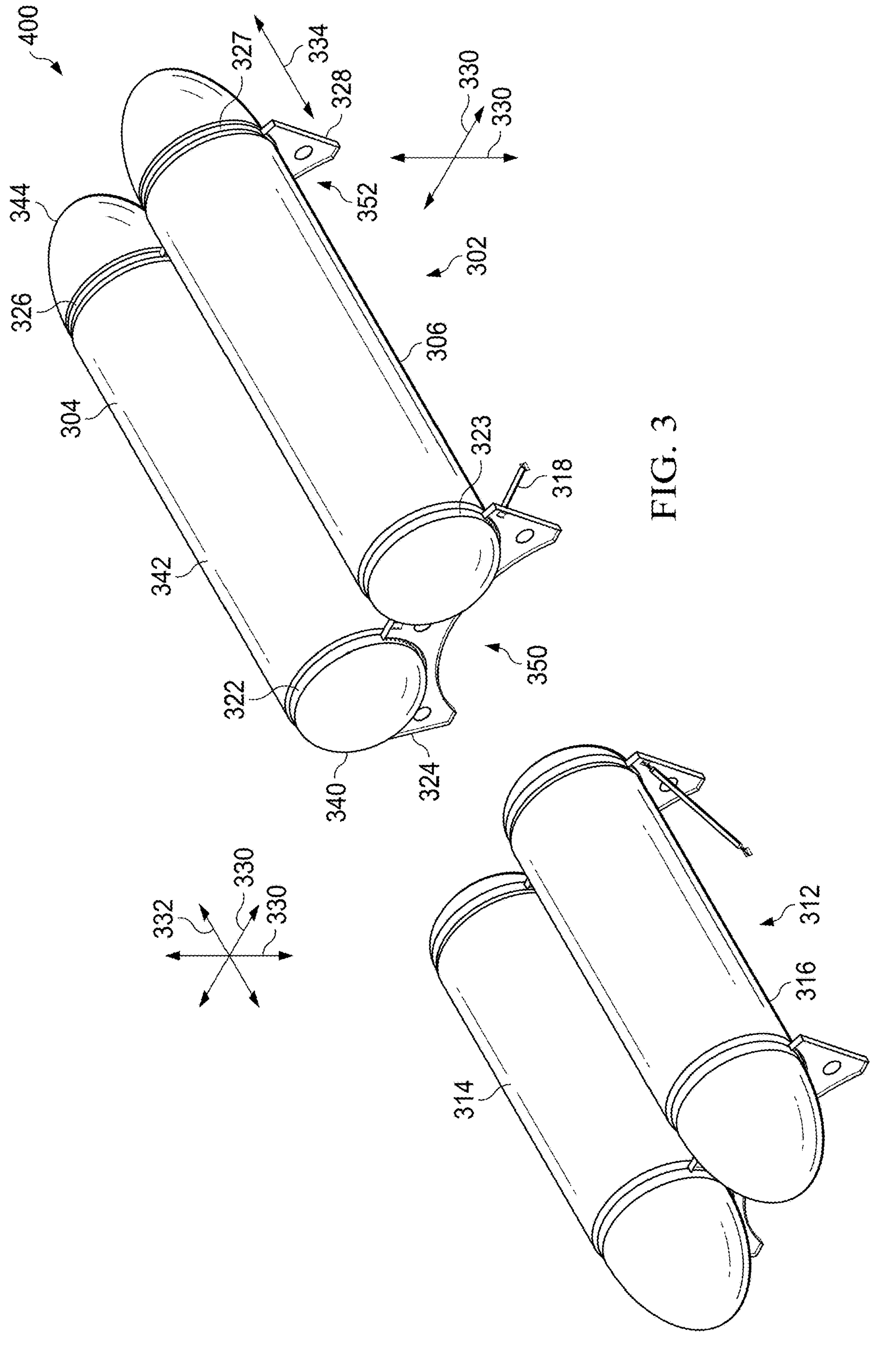
FIG. 3 is an illustration of a cryogenic tanks and a cryogenic tank support system in accordance with an illustrative embodiment.
Figure 4:
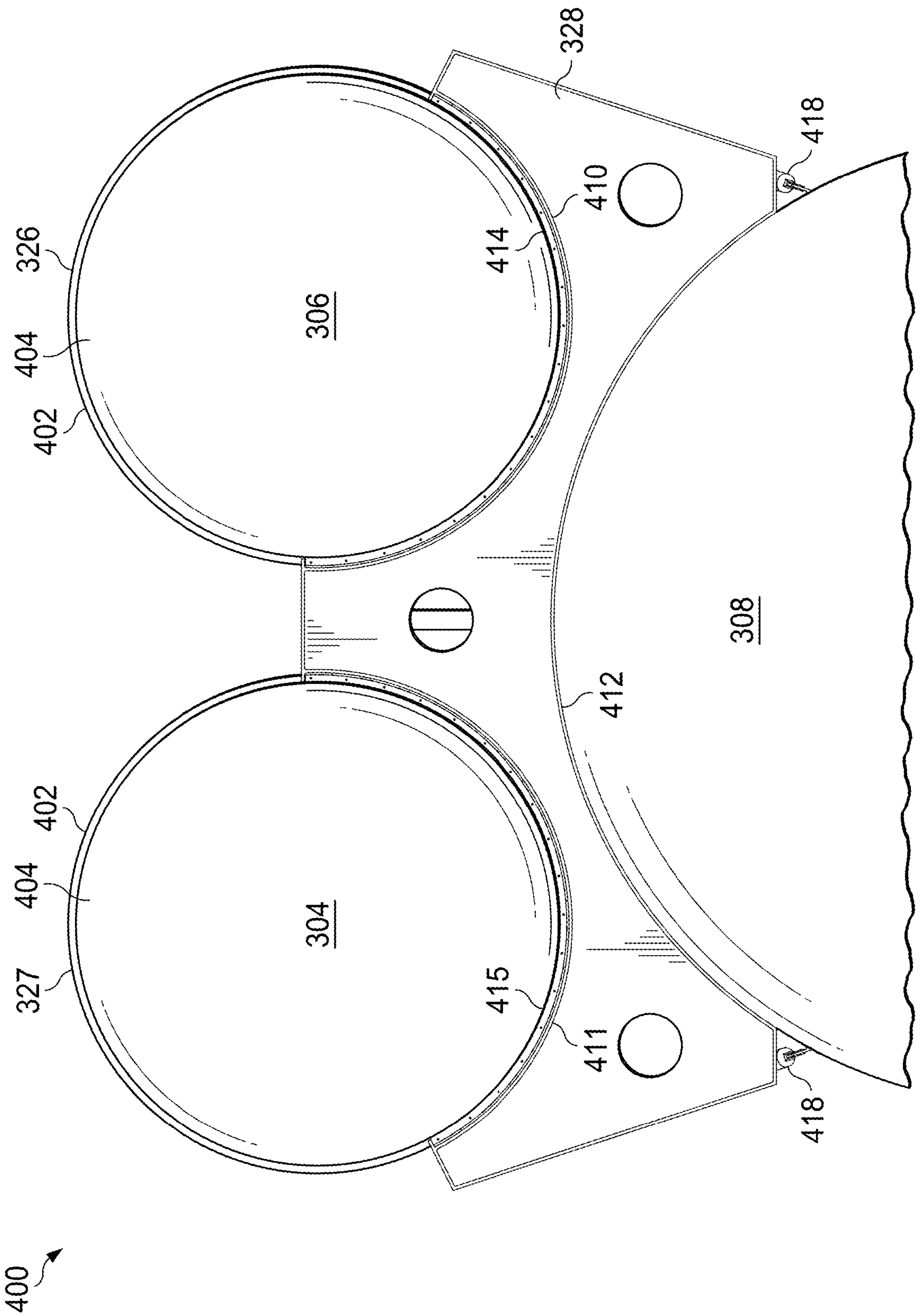
FIG. 4 is an illustration of a cryogenic tank support system in accordance with an illustrative embodiment.

With reference next to FIGS. 3-4, illustrations of cryogenic tanks connected to a tank support system in accordance with an illustrative example. The components illustrated in FIGS. 3-4 are examples of physical implementations of tank support system 108 and cryogenic tank 110 shown in block form in FIG. 1. Tank support system 302 connects cryogenic tank 304 and cryogenic tank 306 to aircraft 308. Tank support system 312 connects cryogenic tank 314 and cryogenic tank 316 to aircraft 308.

Tank support system 302 includes first support collar 322 and first support collar 323. First support collar 322 and first support collar 323 are each connected to first saddle bracket 324. Strut 318 is connected to first saddle bracket 324 and aircraft 308. Tank support system 302 includes second support collar 326 and second support collar 327. Second support collar 326 and second support collar 327 are each connected to second saddle bracket 328.

Tank support system 302 carries radial loads 330 and axial loads 332 of cryogenic tank 304 and cryogenic tank 306 at end 350 of tank support system 302. Tank support system 302 only carries radial loads 330 of cryogenic tank 304 and cryogenic tank 306 at end 352 of tank support system 302 while allowing axial expansion/contraction 334 of cryogenic tank 304 and cryogenic tank 306 at end 352 of tank support system 302 relative to aircraft 308. Because axial expansion/contraction of the cryogenic tank relative to the fuselage is allowed by tank support system 302, forces acting on the aircraft are isolated from the cryogenic tanks and forces acting on the cryogenic tanks are isolated from the aircraft.

Tank support system 312 has the exact same setup but in a mirrored orientation from tank support system 302. As a result, description of tank support system 312 will not be described further.

Each cryogenic tank 304, 306, 314, and 316 is a double-walled, vacuum layer insulated cryogenic tank. Each tank is comprised of an inner wall spaced from an outer wall by a vacuum insulation layer. Each cryogenic tank is comprised of three sections, for example, cryogenic tank 304 includes end dome 340 connected to cylindrical body 342 connected to nose dome 344. End dome 340 is connected to cylindrical body 342 by, for example, first support collar 322. Cylindrical body 342 is connected to nose dome 344 by, for example, second support collar 326.

Figure 11:
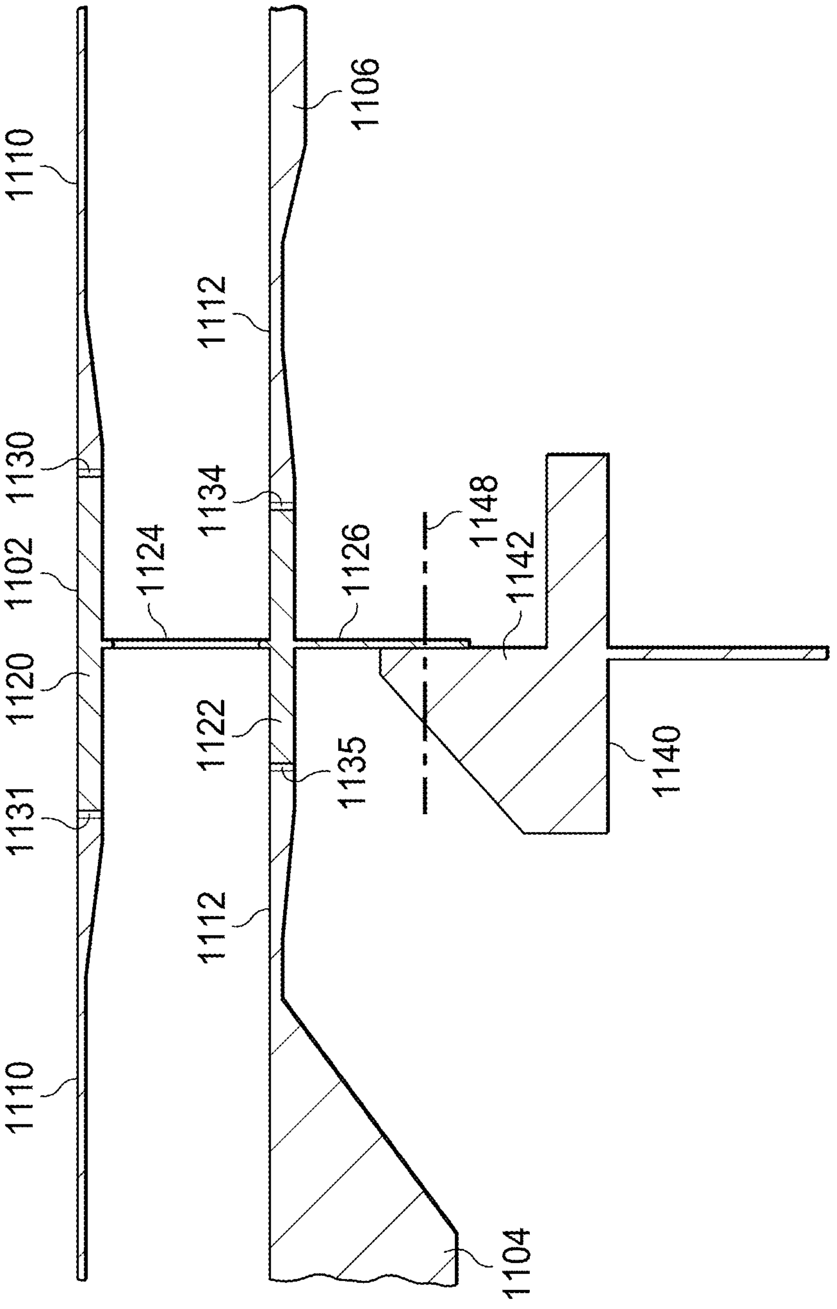
FIG. 11 is an illustration of a cross-section view of a tank support system connected to a cryogenic tank in accordance with an illustrative embodiment.

The inner ring of the support collar is connected to the inner wall of the cryogenic tank (FIG. 11). The inner ring is either welded or co-bonded directly to the inner wall of the cryogenic tank to avoid penetration through the inner wall if traditional mechanical fasteners were to be used. The outer ring of the support collar is connected to the outer wall of the cryogenic tank. As a result, not only does the tank support system connect the cryogenic tanks to fuselage of aircraft, in this illustrative example, first support collar 322 and second support collar 326 support the inner wall of cryogenic tank 304 within the outer wall of cryogenic tank 304. In other words, the support collars keep the outer wall of the cryogenic tank spaced from the inner wall of the cryogenic tank. As a result, a vacuum insulation layer between the inner wall and the outer wall remains uncompromised and provides a cryogenic temperature insulation layer.

FIG. 4 shows view 400 from FIG. 3. Shape 402 of second support collar 326 and second support collar 327 is generally circular. Shape 402 matches shape 404 of cryogenic tank 304 and cryogenic tank 306. Generally, cryogenic tank 304 and cryogenic tank 306 are cylindrical shaped. Second saddle bracket 328 includes saddle 410 and saddle 411 positioned opposite of mount surface 412. Mount surface 412 is the edge of second saddle bracket 328 connected to or abutting fuselage of aircraft 308. Saddle 410 has contour 414. Saddle 411 has contour 415. Contour 414 and contour 415 each have a profile that matches shape 402 of second support collar 326 and second support collar 327. Second saddle bracket 328 (in actuality, all the saddle brackets) may be connected to the fuselage of the aircraft along their respective mount surfaces or each saddle bracket may include mount points 418. If mount points 418 are utilized, the respective mount surfaces may not include mounting hardware. Also, each saddle bracket may be connected to the aircraft both along the respective mount surfaces and with mount points 418.

Figure 5:
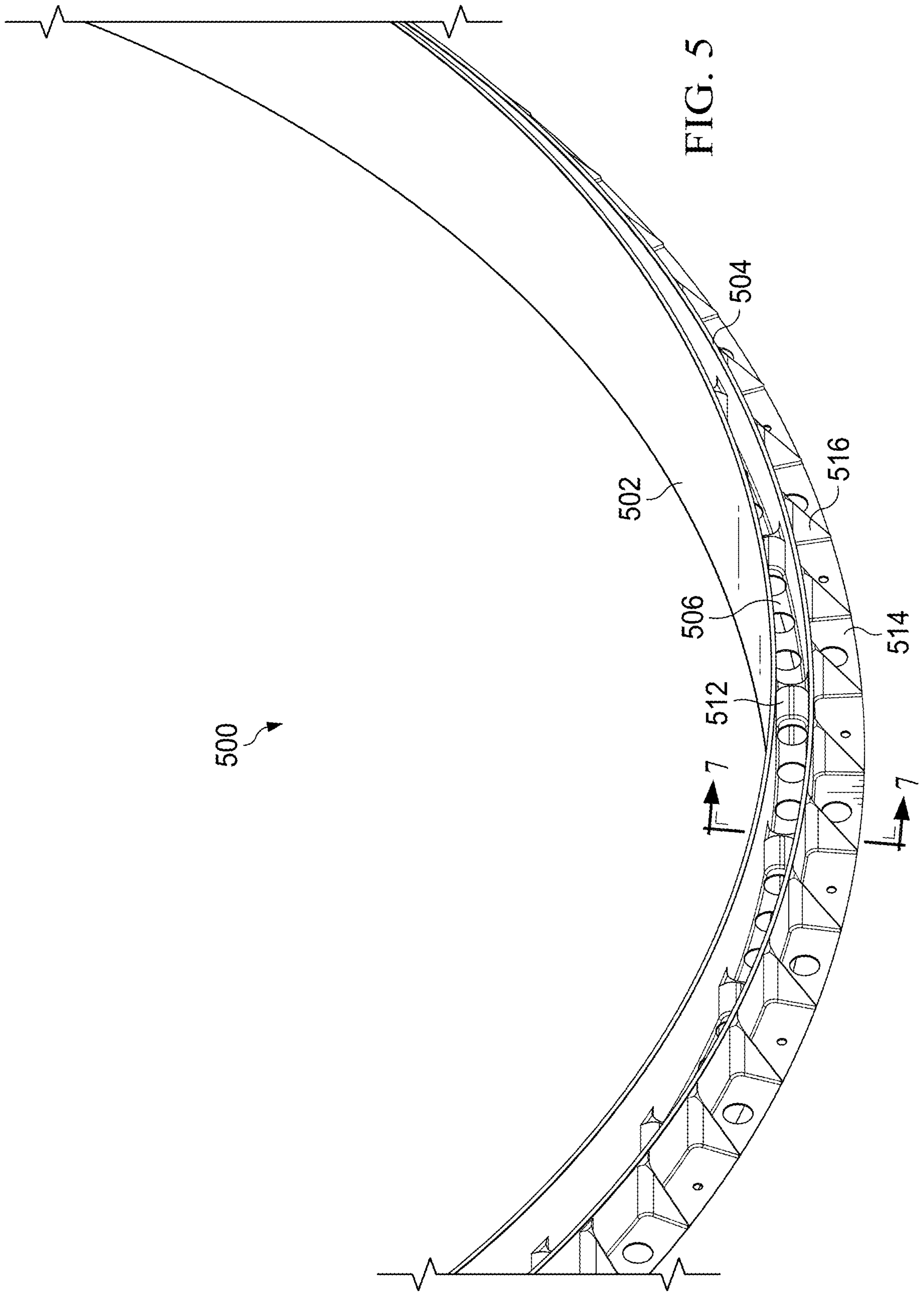
FIG. 5 is an illustration of a support collar of a cryogenic tank support system in accordance with an illustrative embodiment.
Figure 7:
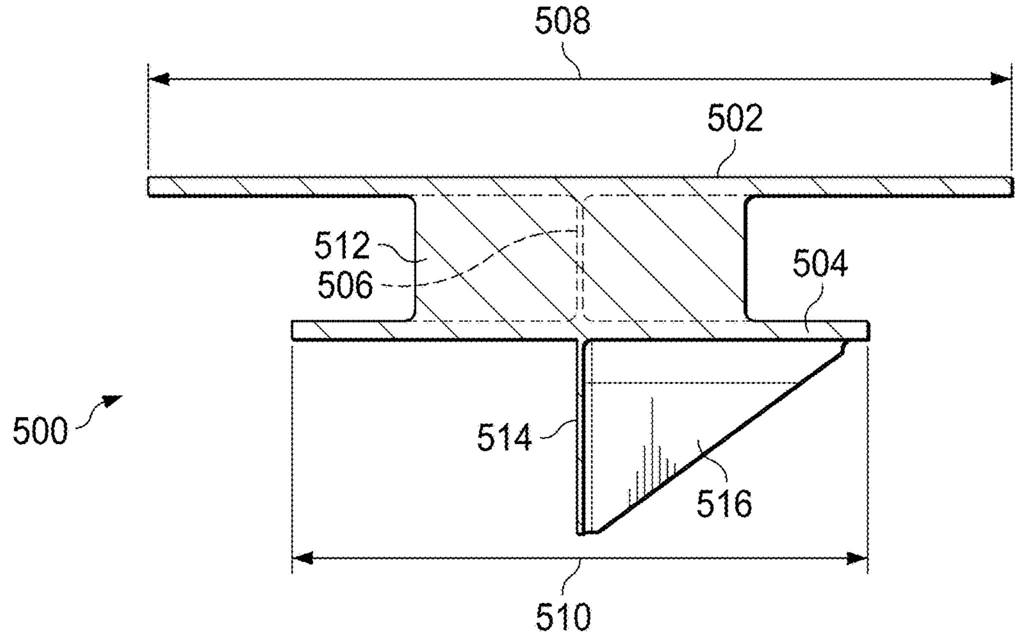
FIG. 7 is an illustration of a cross-section view of a support collar of a cryogenic tank support system in accordance with an illustrative embodiment.

With reference next to FIGS. 5 and 7, an illustration of a first support collar is depicted in accordance with an illustrative embodiment. The components illustrated in FIGS. 5 and 7 are examples of physical implementations of first support collar 120 shown in block form in FIG. 1. FIG. 7 is a cross-section view of a first support collar 500 along line 7-7 of FIG. 5. First support collar 500 includes inner ring 502 connected to outer ring 504 by web 506. Web 506 extends between inner ring 502 and outer ring 504 around the entire circumference of first support collar 500. Inner ring 502 has width 508 while outer ring 504 has width 510. Width 508 is greater than width 510. Thus, inner ring 502 is wider than outer ring 504 to allow access to weld areas (FIG. 11). Rib 512 is connected to inner ring 502 and outer ring 504 between inner ring 502 and outer ring 504. Rib 512 extends at an angle from web 506. Rib 512 can be orthogonal to web 506. Rib 512 may include a set of ribs evenly spaced around the circumference of first support collar 500. Flange 514 extends radially outward from outer ring 504. Gusset 516 is connected to outer ring 504 and flange 514. Gusset 516 may include a set of gussets evenly spaced around the circumference of first support collar 500. Each rib 512 is linearly aligned with at least one gusset 516.

Figure 6:
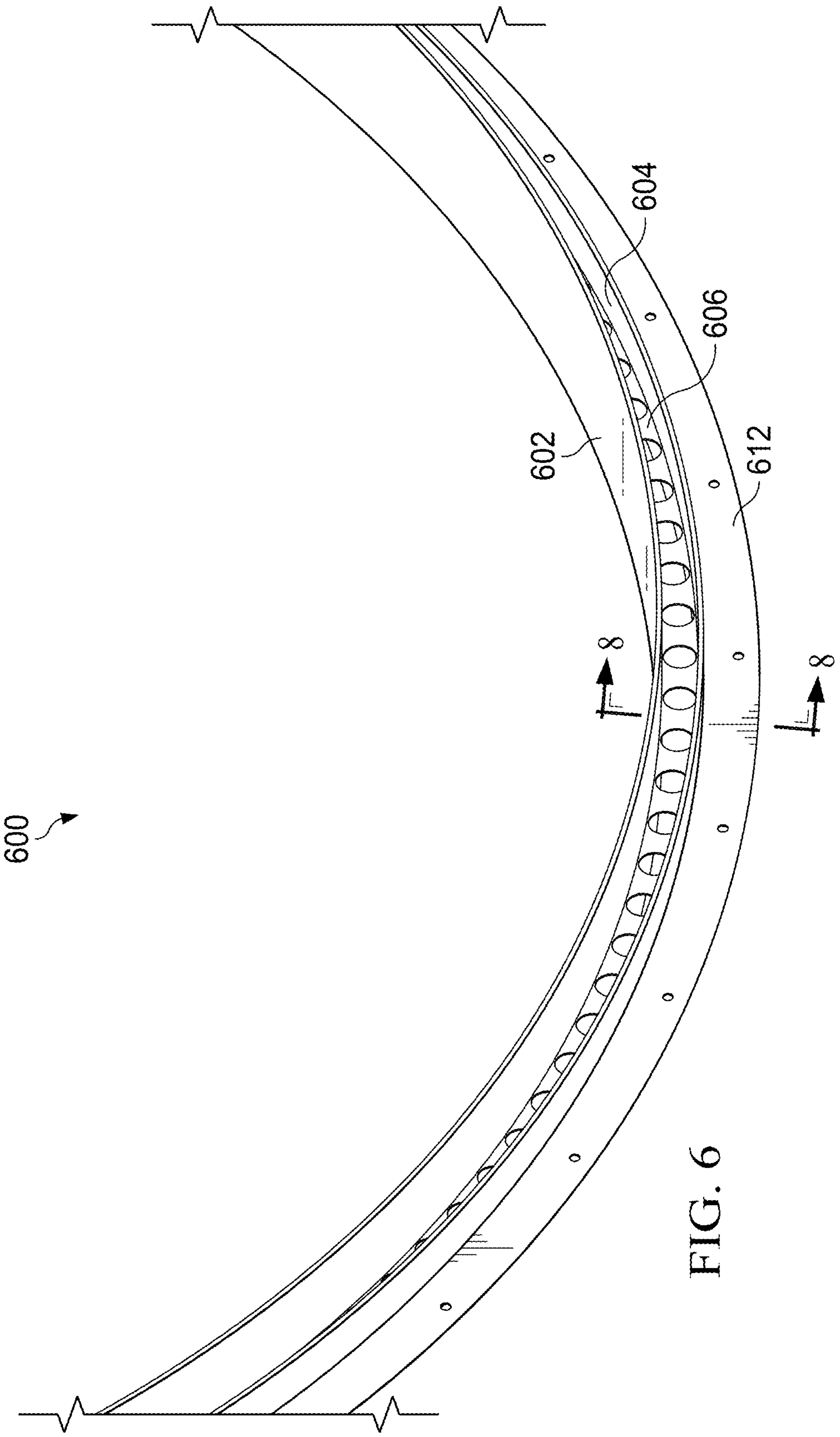
FIG. 6 is an illustration of a support collar of a cryogenic tank support system in accordance with an illustrative embodiment.
Figure 8:
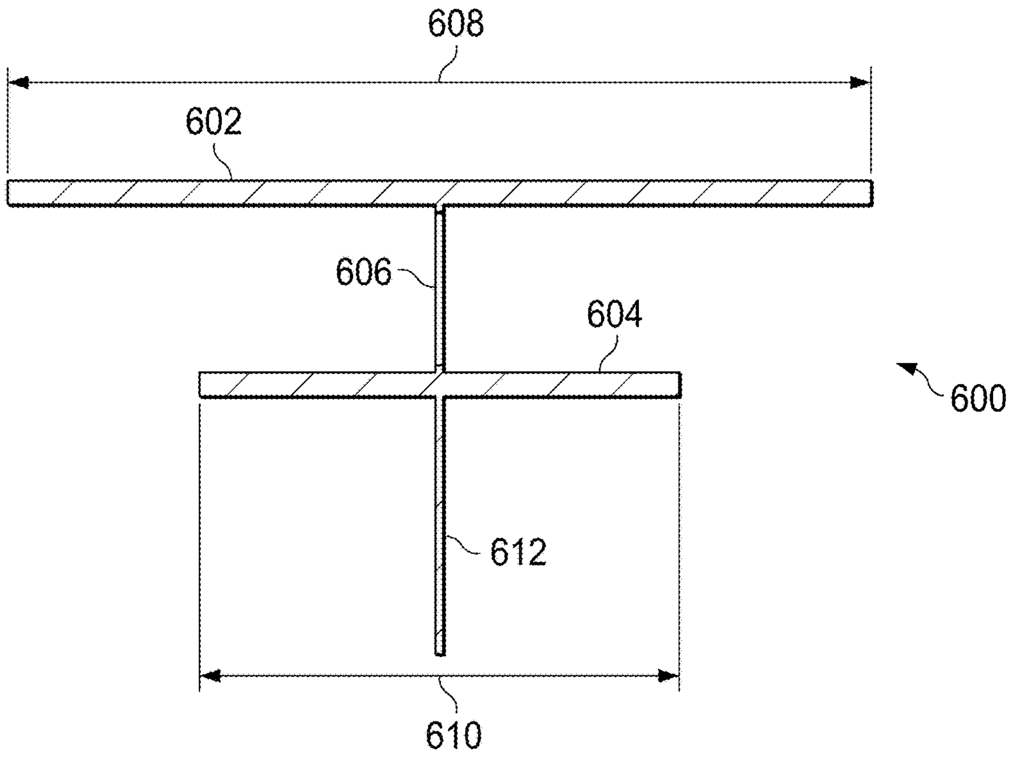
FIG. 8 is an illustration of a cross-section view of a support collar of a cryogenic tank support system in accordance with an illustrative embodiment.

With reference next to FIGS. 6 and 8, an illustration of a second support collar is depicted in accordance with an illustrative embodiment. The components illustrated in FIGS. 6 and 8 are examples of physical implementations of second support collar 122 shown in block form in FIG. 1. FIG. 8 is a cross-section view of second support collar 600 along line 8-8 of FIG. 6. Second support collar 600 includes inner ring 602 connected to outer ring 604 by web 606. Web 606 extends between inner ring 602 and outer ring 604 around the entire circumference of second support collar 600. Inner ring 602 has width 608 while outer ring 604 has width 610. Width 608 is greater than width 610. Thus, inner ring 602 is wider than outer ring 604 to allow access to weld areas (FIG. 11). Flange 612 extends radially outward from outer ring 604.

First support collar 500 is capable of carrying radial loads of the cryogenic tank and axial loads of the cryogenic tank because of the presence of rib 512 and gusset 516. Second support collar 600 does not include ribs or gussets found on first support collar 500. As a result, second support collar 600 is capable of carrying only radial loads of the cryogenic tank while allowing axial expansion/contraction of the cryogenic tank relative to the aircraft.

Figure 9:
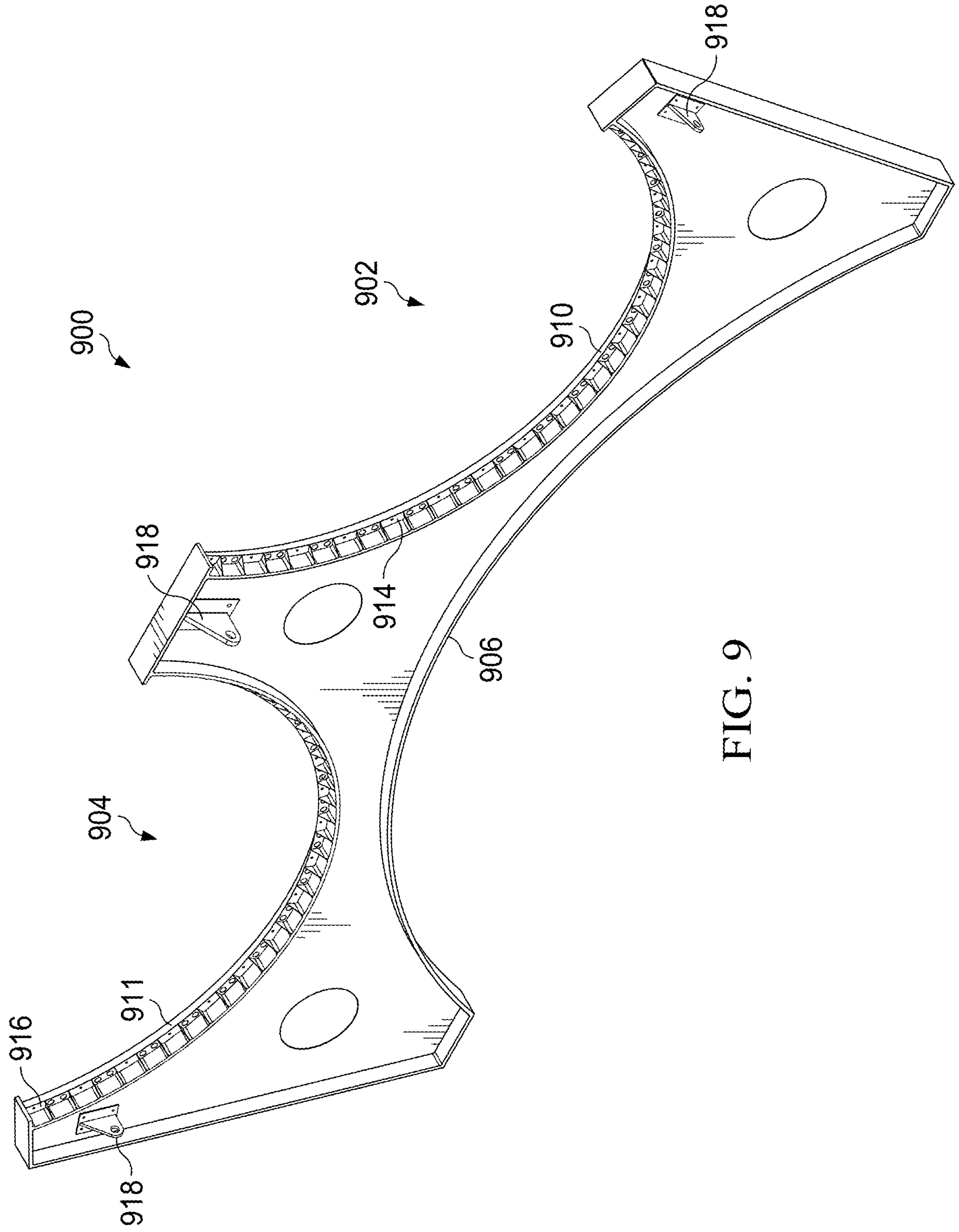
FIG. 9 is an illustration of a saddle bracket of a cryogenic tank support system in accordance with an illustrative embodiment.
Figure 10:
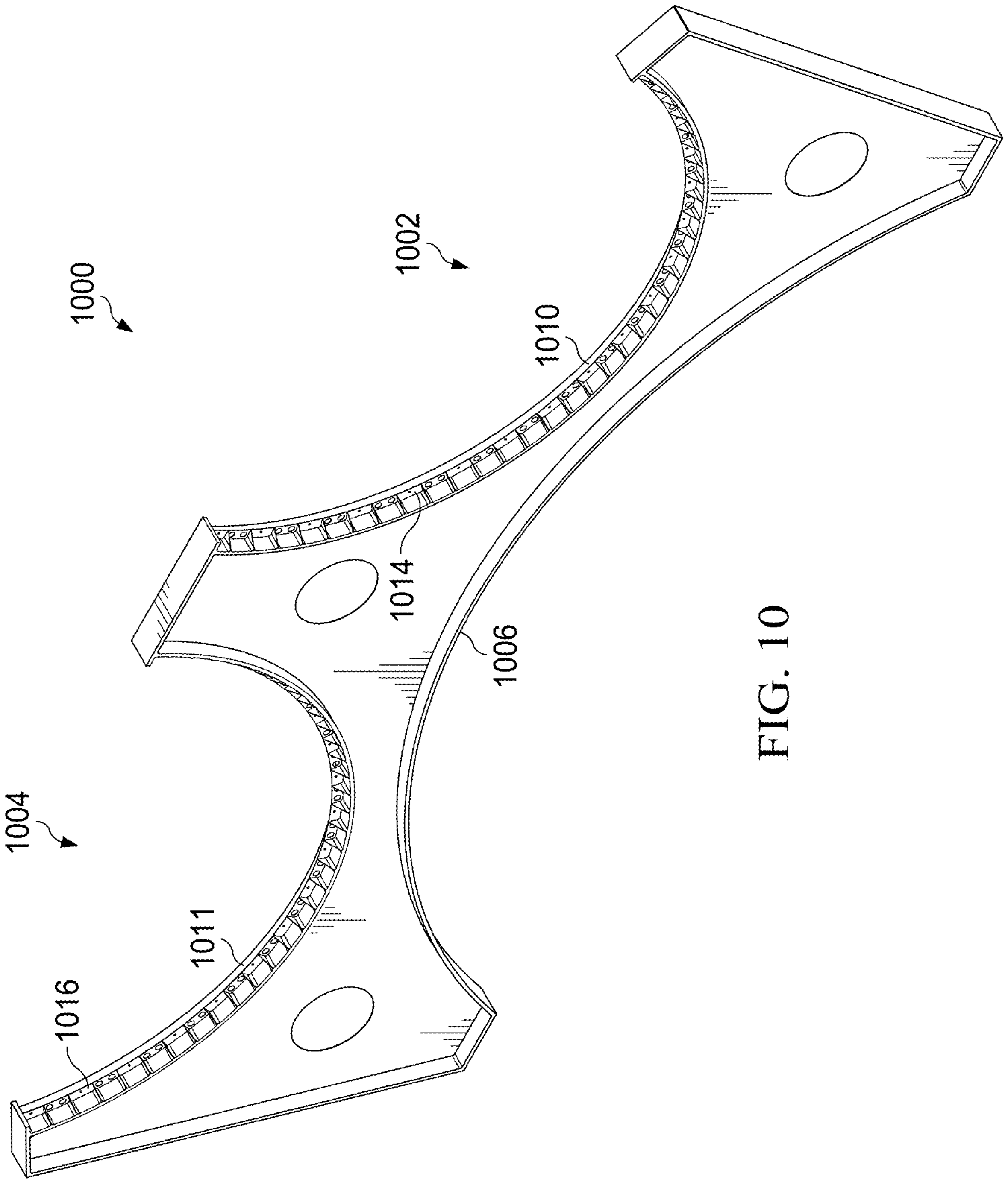
FIG. 10 is an illustration of a saddle bracket of a cryogenic tank support system in accordance with an illustrative embodiment.

With reference next to FIGS. 9-10, illustrations of a saddle brackets are depicted in accordance with an illustrative embodiment. The components illustrated in FIGS. 9-10 are examples of physical implementations of first saddle bracket 124 and second saddle bracket 126 shown in block form in FIG. 1.

First saddle bracket 900 (shown in FIG. 9) includes saddle 902 and saddle 904 positioned opposite of mount surface 906. Mount surface 906 is the edge of first saddle bracket 900 that abuts or is connected to the fuselage of an aircraft. Saddle 902 has contour 910. Saddle 904 has contour 911. Contour 910 and contour 911 each have a profile that matches the shape of a respective support collar. As depicted, contour 910 and contour 911 are arc shaped matching the outer size and dimensions of a cylindrical shaped cryogenic tank. Saddle 902 includes saddle flange 914. Saddle flange 914 is connected to a flange of a support collar with a shear bolt. Saddle 904 includes saddle flange 916. Saddle flange 916 is connected to a flange of a support collar with a shear bolt. A strut is mountable to first saddle bracket 900 at brace 918. First saddle bracket 900 may include more than one brace 918 for connection to more than one strut. First saddle bracket 900 in combination with, for example, first support collar 500, is capable of carrying radial loads of the cryogenic tank. First saddle bracket 900 including a strut and in combination with, for example, first support collar 500 is capable of carrying axial loads of the cryogenic tank because of the presence of a strut or more than one strut connected to first saddle bracket 900 at brace 918.

Second saddle bracket 1000 (shown in FIG. 10) includes saddle 1002 and saddle 1004 positioned opposite of mount surface 1006. Mount surface 1006 is the edge of second saddle bracket 1000 that abuts or is connected to the fuselage of an aircraft. Saddle 1002 has contour 1010. Saddle 1004 has contour 1011. Contour 1010 and contour 1011 each have a profile that matches a shape of a respective support collar. Saddle 1002 includes saddle flange 1014. Saddle flange 1014 is connected to a flange of a support collar. Second saddle bracket 1000 does not include brace 918 for connection to a strut like found on first saddle bracket 900. As a result, second saddle bracket 1000 in combination with, for example, second support collar 600 is capable of carrying only radial loads of the cryogenic tank while allowing axial expansion/contraction of the cryogenic tank.

With reference next to FIG. 11, an illustration of a cross-section view of a tank support system connected to a cryogenic tank. FIG. 11 is representative of the connection between a support collar and two sections of a cryogenic tank. As previously discussed, a support collar connects an end dome of the cryogenic tank to a cylindrical body of the cryogenic tank. An additional support collar connects the cylindrical body of the cryogenic tank to a nose dome of the cryogenic tank.

In this illustrative example, support collar 1102 connects cylindrical body 1104 of a cryogenic tank to nose dome 1106 of a cryogenic tank. Inner wall 1110 of both cylindrical body 1104 and nose dome 1106 is connected to inner ring 1120 of support collar 1102 at weld spots 1130 and 1131. Outer wall 1112 of both cylindrical body 1104 and nose dome 1106 is connected to outer ring 1122 of support collar 1102 at weld spots 1134 and 1135. Web 1124 extends between inner ring 1120 and outer ring 1122. Flange 1126 extend radially outward from outer ring 1122. Saddle flange 1142 of saddle bracket 1140 is connected to flange 1126 with a shear bolt at axis 1148. In an alternative connection, a tension bolt (not shown) could be used to attach outer ring 1122 to saddle bracket 1140. The axis of a tension bolt in this alternative arrangement would be orthogonal to axis 1148.

Figure 12:
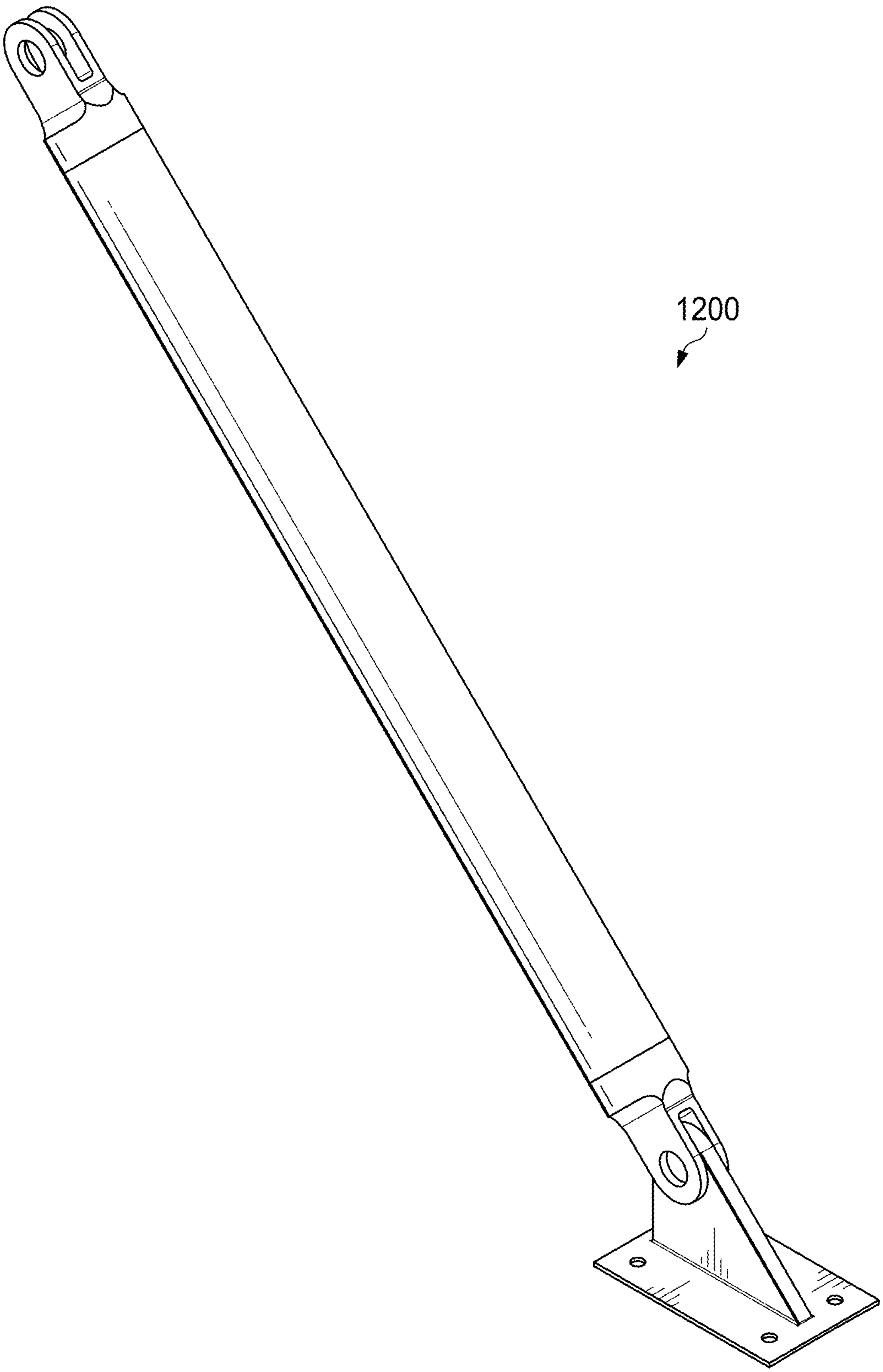
FIG. 12 is an illustration of a strut of a cryogenic tank support system in accordance with an illustrative embodiment.

With reference next to FIG. 12, an illustration of a strut of a cryogenic tank support system is depicted in accordance with an illustrative embodiment. The components illustrated in FIG. 12 are examples of physical implementations of strut 152 shown in block form in FIG. 1. Strut 1200 is connected to the fuselage of an aircraft at end 1202. Strut 1200 is connected to a saddle bracket, for example, first saddle bracket 900 at end 1204. First saddle bracket 900 including strut 1200 is capable of carrying axial loads of the cryogenic tank.

Figure 13:
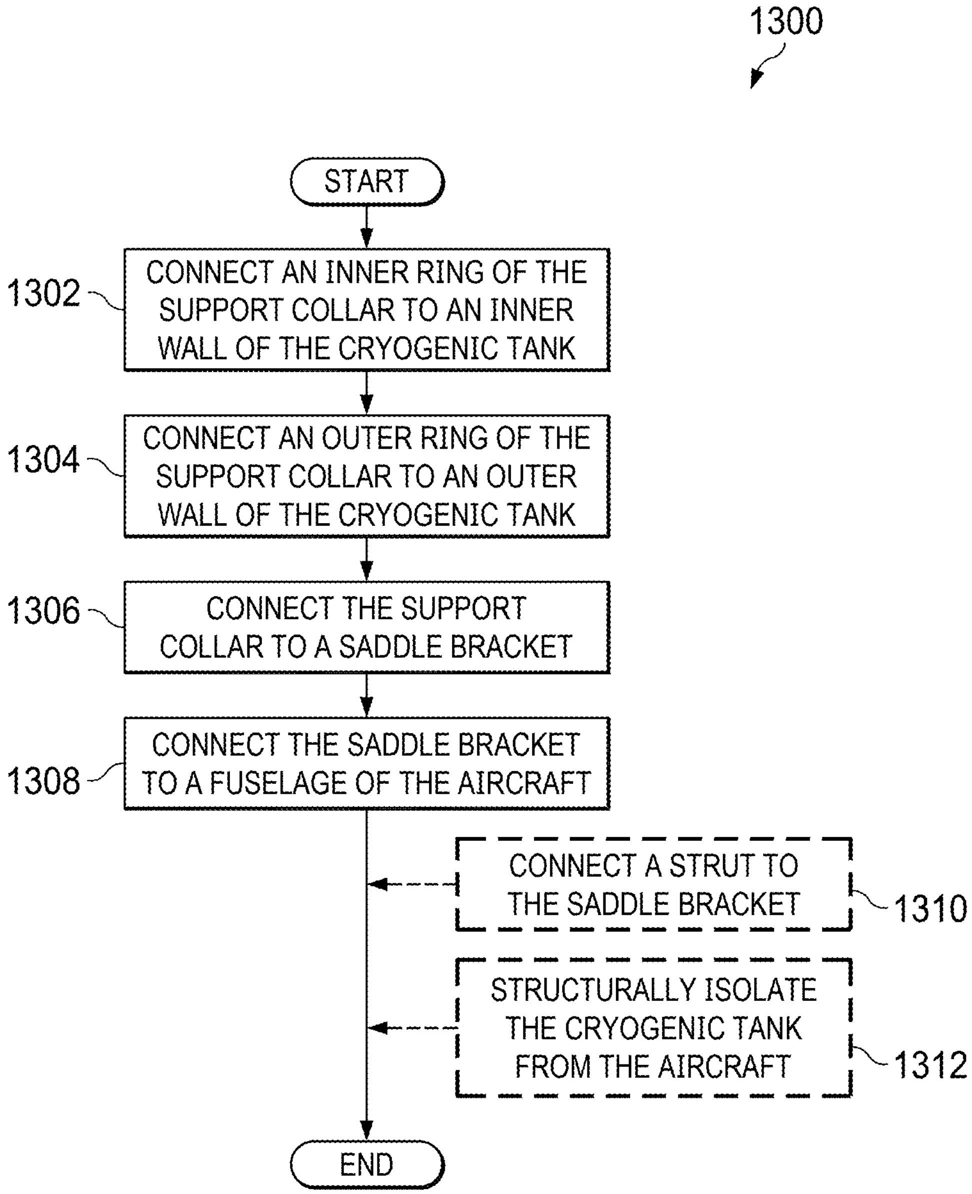
FIG. 13 is an illustration of a flowchart of a process for installing a cryogenic tank on an aircraft in accordance with an illustrative embodiment.

With reference next to FIG. 13, an illustration of a flowchart of a process 800 for installing a cryogenic tank on an aircraft is depicted in accordance with an illustrative embodiment. The method depicted in FIG. 13 may be used in conjunction with the tank support system depicted in FIGS. 1-12.

The process begins by connecting an inner ring of a support collar to an inner wall of the cryogenic tank (operation 1302). The process continues by connecting an outer ring of the support collar to an outer wall of the cryogenic tank (operation 1304). At operation 1306, the process connects the support collar to a saddle bracket. At operation 1308, the process connects the saddle bracket to a fuselage of the aircraft. At operation 1310, the process connects a strut to the saddle bracket. At operation 1312, as a result of the connections, the process structurally isolates the cryogenic tank from the aircraft. The structure carries radial loads of the cryogenic tank and axial loads of the cryogenic tank with at least one support collar and carries the radial loads of the cryogenic tank while allowing axial expansion/contraction of the cryogenic tank with at least one other support collar.

In some alternative implementations of an illustrative example, the function or functions noted in the blocks may not be necessary or may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 14:
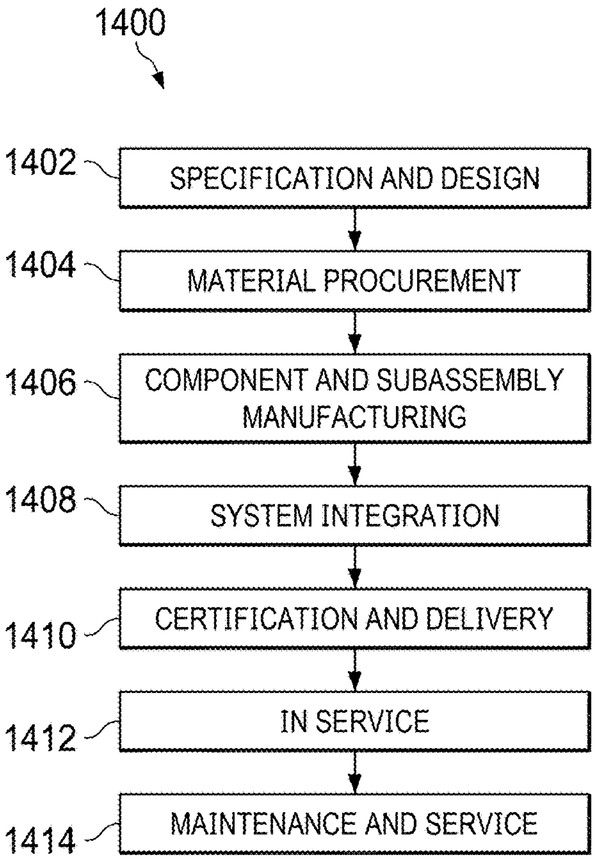
FIG. 14 is an illustration of an aircraft manufacturing and service method in accordance with an illustrative embodiment.
Figure 15:
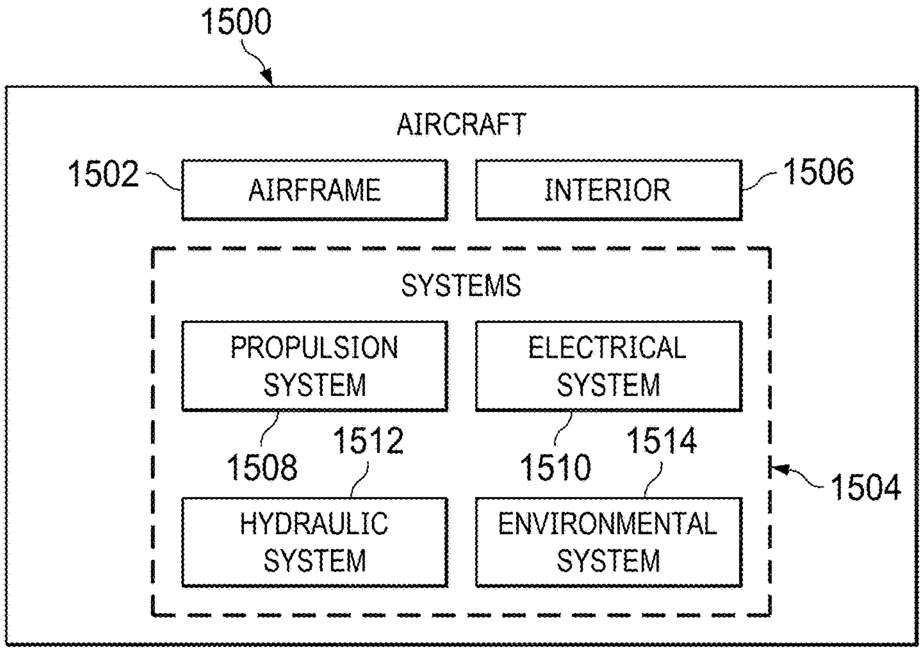
FIG. 15 is an illustration of a block diagram of an aircraft in which an illustrative embodiment may be implemented.

The illustrative embodiments of the disclosure may be further described in the context of aircraft manufacturing and service method 1400 as shown in FIG. 14 and aircraft 1500 as shown in FIG. 15. Turning first to FIG. 14, an illustration of a block diagram of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance, service, or inspection.

The apparatus of this disclosure may be installed on an aircraft during component and subassembly manufacturing 1406. In addition, the apparatus of this disclosure may be retrofitted onto aircraft 1500 in FIG. 15 during routine maintenance and service 1414 as part of a modification, reconfiguration, or refurbishment of aircraft 1500 in FIG. 15.

Each of the processes of aircraft manufacturing and service method 1400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 15, an illustration of a block diagram of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412, during maintenance and service 1414, inclusive of inspection, in FIG. 14, or both. The use of a number of the different illustrative embodiments may substantially expedite the assembly of aircraft 1500, reduce the cost of aircraft 1500, or both expedite the assembly of aircraft 1500 and reduce the cost of aircraft 1500.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A cryogenic tank support apparatus comprising:

a cryogenic tank;

a first saddle bracket;

a second saddle bracket;

a first support collar connected to the cryogenic tank, the first support collar connected to the first saddle bracket; and a second support collar connected to the cryogenic tank, the second support collar connected to the second saddle bracket;

wherein the first support collar carries radial loads of the cryogenic tank and carries axial loads of the cryogenic tank and wherein the second support collar carries only the radial loads of the cryogenic tank and allows axial expansion and axial contraction of the cryogenic tank, wherein the first support collar comprises structural elements to enable the first support collar to carry axial load of the cryogenic tank, wherein the structural elements include at least one of a plurality of ribs and a plurality of gussets, and wherein the second support collar is configured to be devoid of the structural elements to carry an axial load of the cryogenic tank allowing movement of the second support collar in an axial direction of the cryogenic tank in response to an axial load of the cryogenic tank to thereby allow axial expansion and axial contraction of the cryogenic tank.

2. The apparatus of claim 1, wherein each of the first support collar and the second support collar comprises:

an inner ring;

a web connected to the inner ring;

an outer ring connected to the web; and a flange extending radially outward from the outer ring.

3. The apparatus of claim 2, wherein the inner ring is connected to an inner wall of the cryogenic tank and the outer ring is connected to an outer wall of the cryogenic tank.

4. The apparatus of claim 2, wherein the plurality of ribs of the first support collar is connected to the inner ring and the outer ring between the inner ring and the outer ring, the plurality of ribs extending from the web, wherein the plurality of ribs provides rigidity of the first support collar in the axial direction relative of the cryogenic tank, and wherein the second support collar is devoid of the plurality of ribs to allow expansion and contraction of the cryogenic tank in the axial direction of the cryogenic tank.

5. The apparatus of claim 2, wherein the inner ring is wider than the outer ring.

6. The apparatus of claim 1, wherein each of the first support collar and the second support collar are welded or bonded to the cryogenic tank.

7. The apparatus of claim 1, wherein each of the first saddle bracket and the second saddle bracket comprises:

a saddle having a contour that matches a shape of a respective support collar and the cryogenic tank;

a saddle flange extending from the saddle; and a shear bolt for connecting the saddle flange to a flange extending from the respective support collar.

8. The apparatus of claim 7, wherein the first saddle bracket carries the radial loads of the cryogenic tank and wherein the first saddle bracket further comprises a strut that carries the axial loads of the cryogenic tank and wherein the second saddle bracket only carries the radial loads of the cryogenic tank and allows axial expansion and axial contraction of the cryogenic tank.

9. The apparatus of claim 7, wherein each of the first saddle bracket and the second saddle bracket further comprises a mount surface positioned opposite the saddle, the mount surface for connection to a fuselage of an aircraft.

10. The apparatus of claim 1, wherein each of the first saddle bracket and the second saddle bracket are connected to a frame of a fuselage of an aircraft in a crown region of the aircraft.

11. The apparatus of claim 1, wherein each of the first saddle bracket and the second saddle bracket are connected to a frame of a fuselage of an aircraft in a side region of the aircraft.

12. The apparatus of claim 1, wherein the cryogenic tank comprises:

an inner wall; and an outer wall encasing the inner wall and separated from the inner wall by a vacuum insulation layer.

* * * * *